(12) United States Patent
Chen et al.

(10) Patent No.: US 10,866,838 B2
(45) Date of Patent: Dec. 15, 2020

(54) CLUSTER COMPUTING SERVICE ASSURANCE APPARATUS AND METHOD

(71) Applicant: Intel Corporation, Santa Clara, CA (US)

(72) Inventors: Xiaodong Chen, Shanghai (CN); Binggang Wo, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 15/553,889

(22) PCT Filed: Mar. 25, 2015

(86) PCT No.: PCT/CN2015/075051
§ 371 (c)(1),
(2) Date: Aug. 25, 2017

(87) PCT Pub. No.: WO2016/149922
PCT Pub. Date: Sep. 29, 2016

(65) Prior Publication Data
US 2018/0067776 A1 Mar. 8, 2018

(51) Int. Cl.
*G06F 9/50* (2006.01)
*H04L 12/24* (2006.01)

(52) U.S. Cl.
CPC .......... *G06F 9/5044* (2013.01); *G06F 9/5016* (2013.01); *G06F 9/5066* (2013.01); *H04L 41/0813* (2013.01); *H04L 41/0896* (2013.01)

(58) Field of Classification Search
CPC ..... G06F 9/5044; G06F 9/5016; G06F 9/5066
See application file for complete search history.

(56) References Cited

U.S. PATENT DOCUMENTS 8,707,308 B1 * 4/2014 Naamad .............. G06F 12/0862
718/100
2003/0053455 A1 * 3/2003 Kryskow, Jr. ......... H04L 69/329
370/389
(Continued)

OTHER PUBLICATIONS

Extended European Search Report dated Nov. 6, 2018 for European Patent Application No. 15885861.3, 11 pages.
(Continued)

*Primary Examiner* — Abdullahi E Salad
(74) *Attorney, Agent, or Firm* — Schwabe, Williamson & Wyatt, P.C.

(57) ABSTRACT

Apparatuses, methods and storage medium associated with cluster computing are disclosed herein. In embodiments, a server of a computing cluster may include memory. input/output resources, and one or more processors to operate one of a plurality of application slaves of an application master; wherein the other application slaves are operated on other servers, which, together with the server, are members of the computing cluster. The server may further include a service assurance manager agent to manage allocation of the one or more processors, the memory and the input/output resources to the application slave, to assure compliance with a node level service level agreement, derived from an application level service level agreement, to contribute to proximate assurance of compliance with the application level service agreement; wherein the application level service agreement specifies the aggregate service level to be jointly provided by the application master and slaves. Other embodiments may be described or claimed.

21 Claims, 7 Drawing Sheets

(56) References Cited

U.S. PATENT DOCUMENTS

| | | | |
|---|---|---|---|
| 2005/0005200 A1* | 1/2005 | Matena | G06F 9/5072 |
| | | | 714/38.13 |
| 2005/0165925 A1* | 7/2005 | Dan | G06F 9/5083 |
| | | | 709/224 |
| 2006/0200494 A1* | 9/2006 | Sparks | H04L 41/12 |
| 2007/0005302 A1* | 1/2007 | Graupner | G06F 11/3447 |
| | | | 702/188 |
| 2008/0058347 A1* | 3/2008 | Iwasawa | A61K 45/06 |
| | | | 514/255.05 |
| 2008/0198757 A1* | 8/2008 | Dan | H04L 41/5009 |
| | | | 370/252 |
| 2008/0240150 A1* | 10/2008 | Dias | H04L 41/5003 |
| | | | 370/465 |
| 2009/0006526 A1* | 1/2009 | Gingell, Jr. | G06F 9/5055 |
| | | | 709/202 |
| 2009/0132704 A1* | 5/2009 | Emuchay | H04L 63/08 |
| | | | 709/224 |
| 2009/0177775 A1* | 7/2009 | Radia | H04L 12/6418 |
| | | | 709/226 |
| 2011/0099265 A1 | 4/2011 | Antani et al. | |
| 2011/0238825 A1* | 9/2011 | Maffione | H04L 41/06 |
| | | | 709/224 |
| 2012/0005345 A1 | 1/2012 | Doyle et al. | |
| 2012/0021818 A1 | 9/2012 | Jackson et al. | |
| 2013/0346512 A1* | 12/2013 | Thiel | G06F 11/3409 |
| | | | 709/206 |
| 2014/0173098 A1* | 6/2014 | Bartfai-Walcott | |
| | | | H04L 47/2425 |
| | | | 709/224 |
| 2014/0379889 A1* | 12/2014 | Faraboschi | H04L 41/0823 |
| | | | 709/224 |
| 2016/0072726 A1* | 3/2016 | Soni | H04L 41/147 |
| | | | 709/208 |
| 2016/0127465 A1* | 5/2016 | Barstow | G06F 16/273 |
| | | | 707/620 |
| 2018/0123911 A1* | 5/2018 | Zhang | H04L 41/5019 |
| 2018/0219956 A1* | 8/2018 | Wang | H04L 67/16 |
| 2018/0316577 A1* | 11/2018 | Freeman | H04L 41/5009 |

OTHER PUBLICATIONS

Rajkumar Buyya et al., "SLA-Orientated Resource Provisioning for Cloud Computing: Challenges, Architecture, and Solutions" Dec. 12, 2011, 10 pages; 2011 International Conference on Cloud and Service Computing.

International Search Report and Written Opinion dated Dec. 32, 2016 for International Application No. PCT/CN2015/075051, 11 pages.

* cited by examiner

CLUSTER COMPUTING SERVICE ASSURANCE APPARATUS AND METHOD

CROSS REFERENCE TO RELATED APPLICATIONS

The present application is a national phase entry under 35 U.S.C. § 371 of International Application No. PCT/CN2015/075051, filed Mar. 25, 2015, entitled "CLUSTER COMPUTING SERVICE ASSURANCE APPARATUS AND METHOD", which designated, among the various States, the United States of America. The Specification of the PCT/CN2015/075051 Application is hereby fully incorporated by reference.

TECHNICAL FIELD

The present disclosure relates to the field of computing. More particularly, the present disclosure relates to cluster computing service assurance.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In many real life computer cluster deployment (e.g., big data cluster), there can be multiple application tasks running in parallel without any physical or logical isolation due to overall hardware resources shortage/scarcity or cluster sharing usages. The application tasks consume and even compete for the same set of underlying hardware resources, e.g., central processing unit (CPU), memory, and input/output (I/O) resources in each of the computer nodes employed. Due to dynamic needs of the application during its lifecycle, resource allocation to the various instances of the application may result in resource imbalance and unsatisfied service level agreement and thus poor user experience.

For example, existing resource scheduling solutions like Hadoop YARN for big data cluster deployments allocate resources for requesting application according to their static resource allocation configurations instead of their real-time resource need and usage that can be very dynamic during various stages of the application lifecycle. Static resource allocation is far from satisfactory. Some other solutions provide operating system (including virtual machines) or computer node level resource isolation to guarantee the service level agreement (SLA) of the systems or applications of interest. However, this level of service assurance granularity is too coarse and does not address the scenarios of sharing the resources among applications within the same cluster or even the same node.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with cluster computing are disclosed herein. In embodiments, a server of a computing cluster may include memory and input/output resources; and one or more processors coupled with the memory and the input/output resources, to operate one of a plurality of application slaves of an application master; wherein the other application slaves are operated on other servers, which, together with the server, are members of the computing cluster. The server may further include a service assurance manager agent to manage allocation of the one or more processors, the memory and the input/output resources to the application slave, to assure compliance with a node level service level agreement, derived from an application level service level agreement, to contribute to proximate assurance of compliance with the application level service agreement; wherein the application level service agreement specifies the aggregate service level to be jointly provided by the application master and slaves.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter.

However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

"The terms "master" and "slave" as used herein are for their technical meaning. The terms "application master" and "application slaves" are synonymous with "application parent" and "application children." The term "service assurance manager master" is synonymous with "service assurance manager broker."

Figure 1:
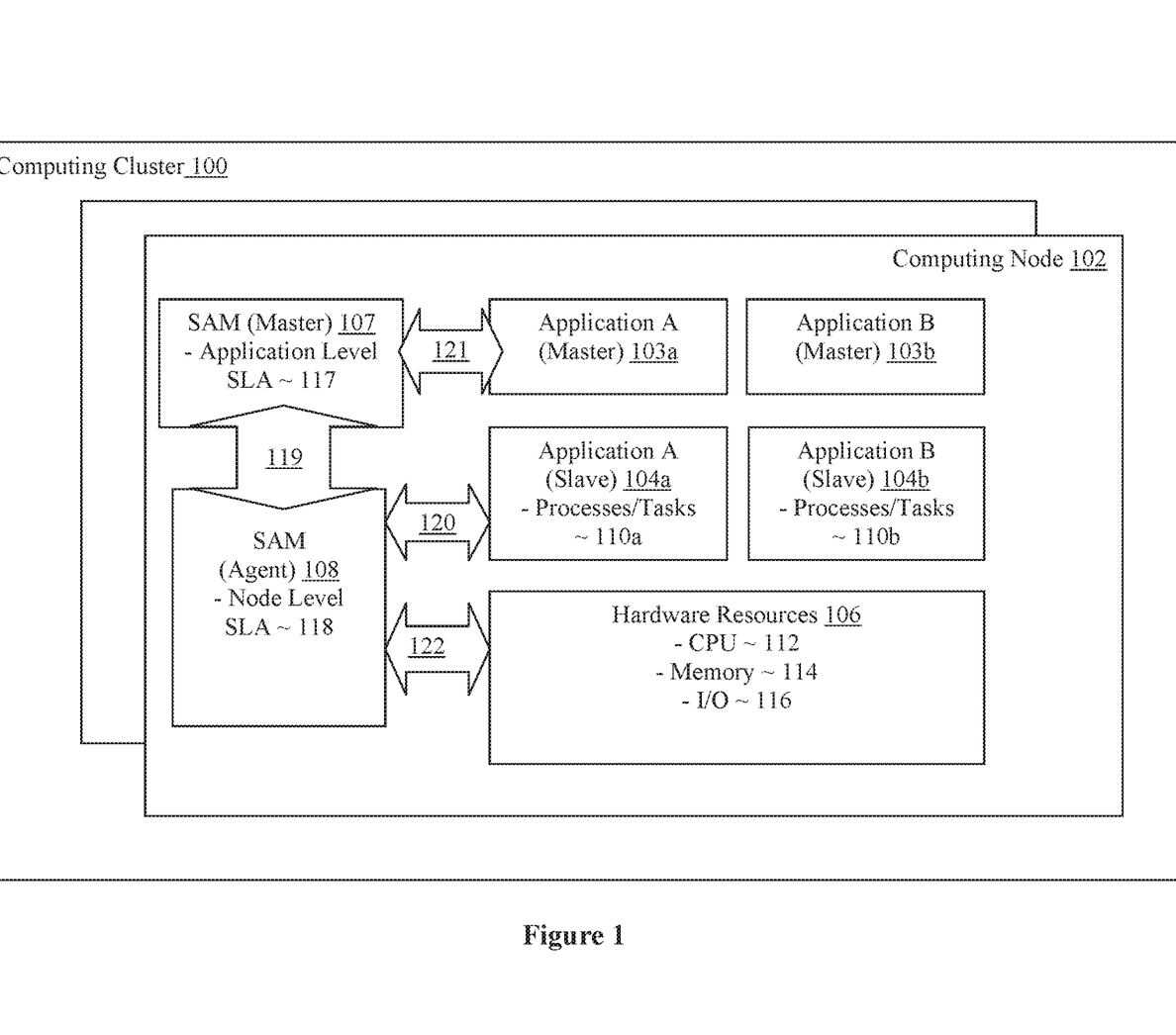
FIG. 1 illustrates a block diagram of a cluster computing environment incorporated with the node level service assurance technique of the present disclosure, according to various embodiments.

Referring now to FIG. 1, wherein a block diagram illustrating a cluster computing environment incorporated with the node level service assurance technique of the present disclosure, according to various embodiments, is shown. As illustrated, computing cluster 100 may include a number of computing nodes 102. Each computing node 102 may include various hardware resources 105, such as CPU 112, memory 114 and input/output resources 115, and at least one slave of each of a plurality of applications, e.g., 104a and 104b, operated thereon. Each application may include an application master 103a/103b spawning application slaves 104a/104b in the plurality of computing nodes 102. Each application slave 104a/104b may have a number of processes/tasks 110a/110b. Further, each computing node 102 may include a service assurance manager (SAM) agent 108 to dynamically manage allocation of CPU 112, memory 114 and I/O 115 resources to application slaves 104a/104b, to assure compliance with respective node level service level agreements (SLA) 118. Each SLA 118 may be derived from a corresponding application level service level agreement 117 that specifies the aggregate service level to be jointly provided by the application master and slaves 103a and 104a or 103b and 104b on the various computing nodes 102. Resultantly, respective compliance to the derived SLA 118 of an application slave at each computing node 102 may contribute to proximate assurance of compliance with the overall application level service agreement 117.

For example, a computing cluster hosting an application for processing transactions may have a SLA of 100,000 transactions per second. In embodiments, four (4) substantially similar computing nodes, in terms of capability and capacity, may be employed to host four (4) application slaves spawned by the application master. The application level SLA may be proximately assured by assuring compliance of each computing node with a derived SLA of 25,000 transactions per sec. In another example, three (3) dissimilar computing nodes, in terms of capability and capacity, may be employed to host three (3) instances of the application. The application level SLA may be proximately assured by assuring compliance of respective derived SLA of 50,000 transactions per second, 35,000 transactions per second, and 25,000 transactions per second (totaling more than 100,000 transactions per second). The respective derived SLA of 50,000) transactions per second, 35,000 transactions per second, and 25,000 transactions per second may roughly correspond to the relative processing power of the three (3) dissimilar computing nodes.

In embodiments, various SAM agents 108 correspondingly located in various computing nodes 102 may be coordinated by a SAM master 107. In embodiments, SAM master 107 may be disposed on its own computing node 102, or share a computing node 102 with a SAM agent 108, as illustrated. In embodiments, SAM master 107 may include a configuration interface (not shown) to facilitate configuration of SAM master 107 with the application level SLA 117 of the applications. In embodiments, SAM master 107 may derive the node level SLA 118, and provide the node level SLA 118 to the various SAM agent 108 respectively disposed on computing nodes 102. In embodiments, SAM master 107 may provide the node level SLA 118 to the various SAM agent 108 via communications 119. In embodiments, SAM master 107 may derive the node level SLA 118, based at least in part on computing node usage information, obtained from application master 103a/103b. In embodiments, SAM master 107 may obtain the computing node usage information from application master 103a/103b through interactions 121.

In embodiments, SAM agent 108 may assure compliance with a node level service level agreement (SLA) 118, via interactions 120 to understand the needs of application instances 104a/104b, and communications 122 to dynamically regulate allocation of CPU 112, memory 114 and I/O 115 resources to application slaves 104a/104b. In embodiments, SAM 108 may also assure compliance with a node level SLA 118, via interactions 120 to reduce the resource needs of some application slaves 104a/104b, in favor of other application slaves. In embodiments, reduction of resource needs may include preempting some application slaves, reducing or halting their processes/tasks 110a/110b. In embodiments, halting processes/tasks 110a/110b of application slaves 104a/104b may be coordinated with halting spawning of application slaves 104a/104b by application masters 103/103b. In embodiments, SAM master 107 and SAM agents may coordinate halting of application masters 103a/103b and halting of application slave processes/tasks 110a/110b via interactions 119. And SAM amster 107 may halt spawning of application slaves 104a/104b by application masters 103a/103b via interactions 121.

In embodiments, SAM master and/or agents 107 and/or 108 may be implemented in hardware. For example, SAM master and/or agents 107 and/or 108 may be implemented via an Application Specific Integrated Circuit (ASIC) or a field programmable circuit, such as Field Programmable Gate Arrays (FPGAs) programmed with the operating logic described herein. In alternate embodiments, SAM master and/or agents 107 and/or 108 may be implemented in hardware. For example, SAM master and/or agents 107 and/or 108 may be implemented in assembler instructions of the underlying processor, or in C or higher level language that can be complied into the instruction set architecture of the underlying processor. In still other embodiments, SAM master and agents 107 and/or 108 may be implemented in a hardware/software combination.

CPU 112 may be any one of a number of single or multi-core processors known in the art. Memory 114 may be any one of a number of volatile or non-volatile, electrical, magnetic, and/or optical memory known in the art. I/O resources 115 may include any one of a number of I/O devices/interfaces, such as, but not limited to, wired or wireless networking interfaces, serial and/or parallel I/O interfaces, and so forth. While for ease of understanding, only CPU 112. Memory 114 and I/O 115 are illustrated, hardware resources 105 may include other hardware resources, such as, but not limited to, any one of a number of co-processors, graphics processing units (GPU), math co-processors, digital signal processors (DSP), and so forth.

Further, in addition to hardware resources 105, each computing node 102 may include various firmware/software resources, e.g., various operating system/hypervisor services, such as, but not limited to, scheduler, memory manager, process/task manager, and so forth.

Similarly, each collection of application master and slaves 103a/103b and 104a/104b may be any one of a number of applications known in the art, in particular, big data applications that typically involve simple or complex computations that involve a large amount of data with multiple application slaves instantiated and operated on multiple servers of a computing cluster. Examples of big data applications may include, but not limited to, Consumer product companies and retail organizations' applications monitoring social media like Facebook and Twitter to get a view into customer behavior, preferences, and product perception.

Manufacturers' applications monitoring social networks to detect aftermarket support issues before a warranty failure become publicly detrimental.

Financial Service companies' applications using data mined from customer interactions to divide their users into finely tuned segments, to create more relevant and sophisticated offers.

Advertising and marketing agencies' applications tracking social media to understand responsiveness to campaigns, promotions, and other advertising mediums.

Insurance companies' applications using Big Data analysis to see which home insurance applications can be immediately processed, and which ones need a validating in-person visit from an agent.

Web-based businesses' applications developing information products that combine data gathered from customers to offer more appealing recommendations and more successful coupon programs.

Sports teams' applications using data for tracking ticket sales and even for tracking team strategies.

Thus, except for SAM master and agent 107 and 108, each computing node 102 may be any one of a number cluster computing node known in the art. The constitution and operations of SAM master and agent 107 and 108 will be further described with references to FIGS. 2-5. Before further describing SAM master and agent 107 and 108 and other aspects of the present disclosure, it should be noted that why for ease of illustration, FIG. 1 depict one slave each for two applications, application slave 104a and application slave 104b, the present disclosure is not so limited. As will be readily understood from the description to follow, the present disclosure may be practiced with SAM master and agent 107 and 108 proximately assuring compliance with SLA 117 for one or more applications, via assurance of SLA 118 of any number of application slaves 104a/104b operating on any number of computing nodes 102. Further, in embodiments, the functionality and operations of SAM master 107 may be assumed by one SAM agent 108, or shared among a plurality or all of the SAM agents 108.

Figure 2:
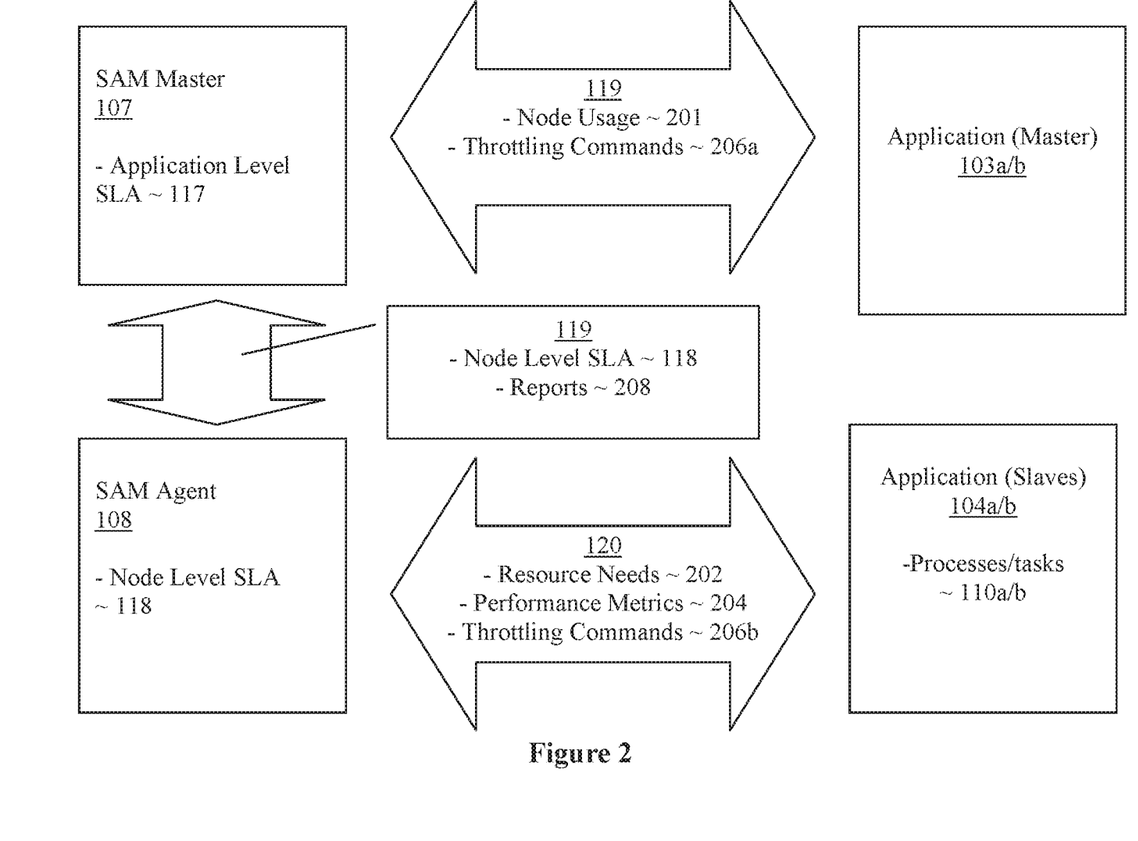
FIG. 2 illustrate communications between a service assurance manager master, a service assurance manager agent, and various application masters and slaves, according to various embodiments.

Referring now to FIG. 2, wherein a block diagram illustrating communications/interactions between SAM master 107, SAM agent 108, application master 103a/b, and an application instance 104a/104b, according to the disclosed embodiments, is shown. As illustrated, application master and slaves 103a/103b and 104a/104b (more specifically, the application in general) may be configured with an interface (not shown) that enables SAM master 107 and SAM agent 108 to query application masters 103a/103b and application slaves 104a/104b for various information. In particular, the interface may be configured to enable SAM master 107 to query an application master 103a/103b for computer node usage, and enable SAM agent 108 to periodically query application slaves 104a/104b on its CPU, memory, I/O et al resource needs 202. For examples, amount of CPU cycle times, amount of memory space, and/or amount of I/O bandwidths desired by application slaves 104a/104b (which may vary over time during operation, depending on the workloads at various points in time or various stages of the application).

In embodiments, application slaves 104a/104b (more specifically, the application in general) may be configured with an interface (not shown) that enables SAM agent 108 to periodically query application slaves 104a/104b on various performance metrics 204, to independently determine resource needs of application slaves 104a/104b. Examples of performance metrics 204 may include, but are not limited to, wait time for CPU cycle, number of cache misses, frequency and/or time incurred for memory swaps, wait time and/or transmission bit rates for I/O channels, and so forth.

In embodiments, application slaves 104a/104b (more specifically, the application in general) may be configured with an interface (not shown) that enables SAM agent 108 to dynamically throttle the resource needs of some of the application slaves 104a/104b (for the benefit of other application slaves on computing node 102). Throttling command 206b may include, but are not limited to, command to instruct application instance 104a/104b to pre-empt one or more of its child processes/tasks 110a/110b, decreasing or increasing the number of child processes/tasks 110a/110b, and/or pausing or resume one or more of the child processes/tasks 110a/110b.

Similarly, in embodiments, application masters 103a/103b (more specifically, the application in general) may be configured with an interface (not shown) that enables SAM master 107 to dynamically throttle 206a the spawning of application slaves 104a/104b by some of application masters 104a/104b (for the benefit of other application masters and slaves on computing nodes 102).

In embodiments, interactions 119 between SAM master 107 and agents 108, as described earlier, may include node level SLA 118 provided to SAM agents 108 by SAM master 107. Additionally, interactions 119 may also include reporting 208 of compliance from SAM agents 108 to SAM master 107, including earlier described halting of processes/tasks 110a/110b, to enable SAM master 107 to similarly halt spawning of application slaves 104a/104b by the affected application masters 103a/103b.

Figure 3:
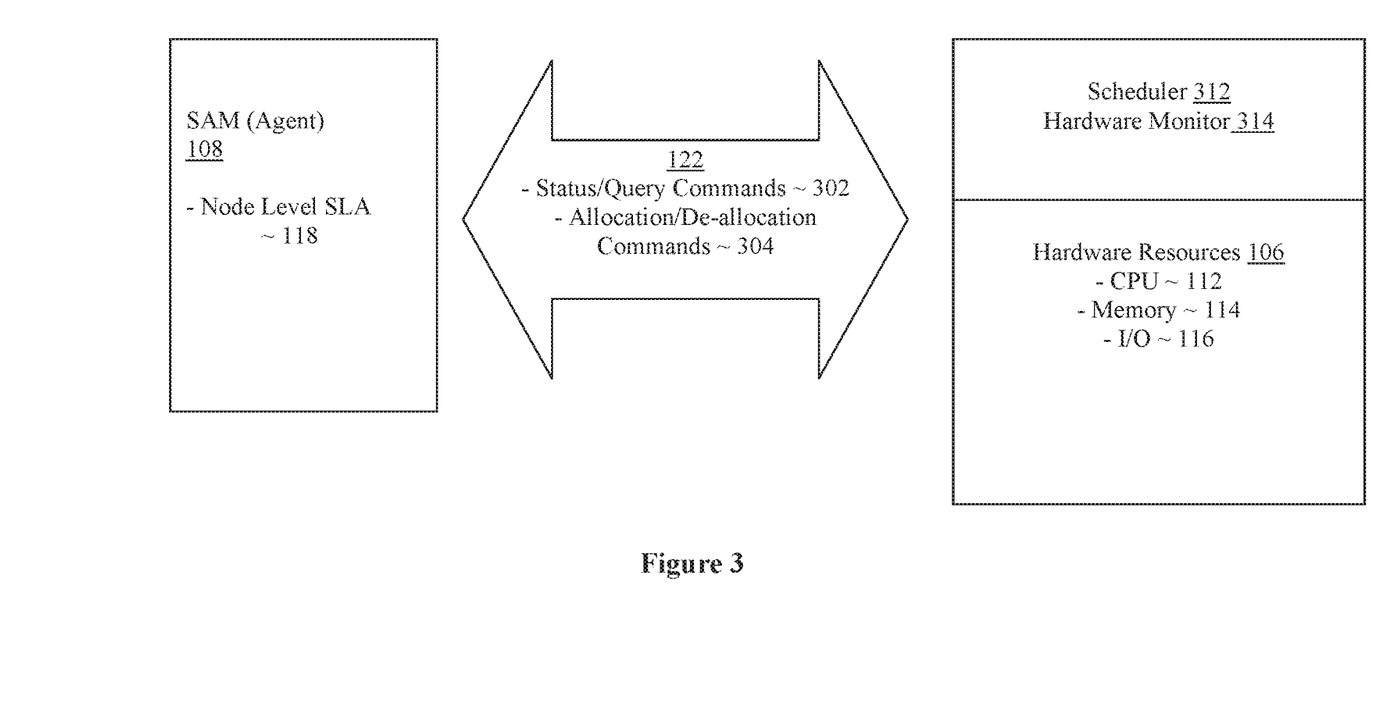
FIG. 3 illustrates communications between a service assurance manager agent and various computing resources, according to various embodiments.

FIG. 3 illustrates communications between the service assurance manager agent and various computing resources, according to the disclosed embodiments. As illustrated, in embodiments, various hardware resources 105, e.g., CPU 112, memory 112 and I/O resources 115 may be configured with interfaces (not shown) to enable SAM agent 108 to query 302 the various hardware resources for status information. For examples, CPU 112 may be queried for its idle and/or busy times, memory 114 may be queried for its allocated and/or unallocated space, latencies, and I/O resources may queried for its availability or unavailability status. In alternate embodiments, computing node 102 may include hardware monitor 314, and SAM agent 108 may query 302 hardware monitor 314 for the various hardware resource status information.

In embodiments, computing node 102 may include scheduler 312, and SAM agent 108 may issue allocation/de-allocation commands 304 to schedule 312 to allocate or de-allocate various hardware resources 108, e.g., CPU 112, memory 114, and I/O resource 115, to application slaves 104a/104b.

Figure 4:
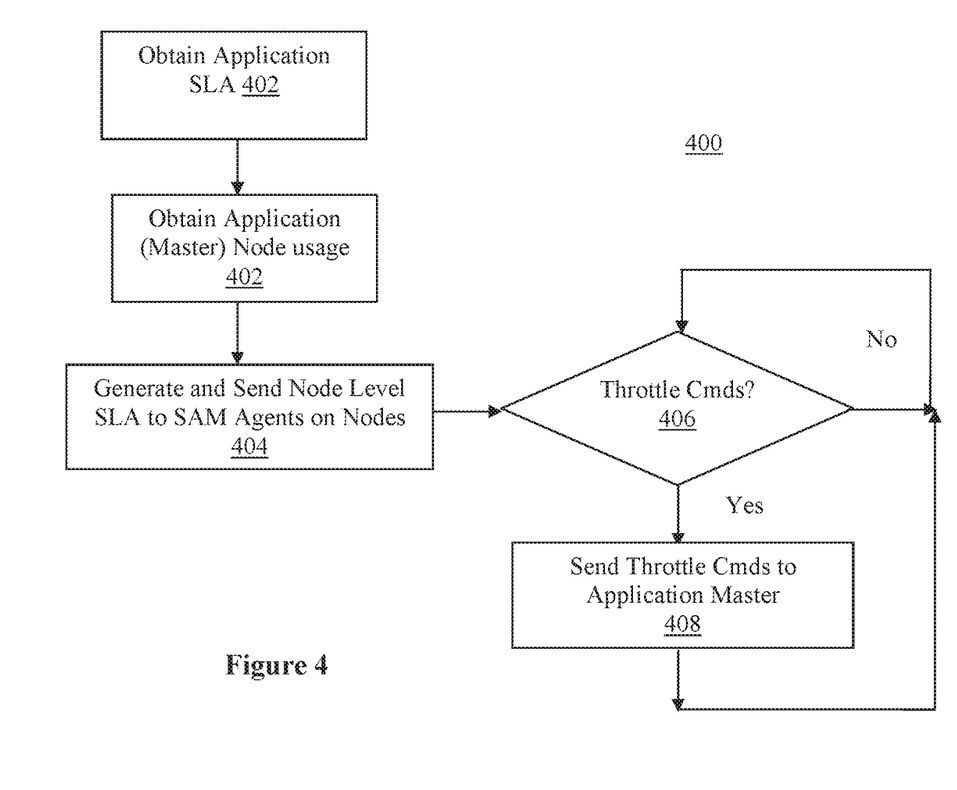
FIGS. 4-5 illustrate an example process for assuring service level via node level service assurance, according to various embodiments.
Figure 5:
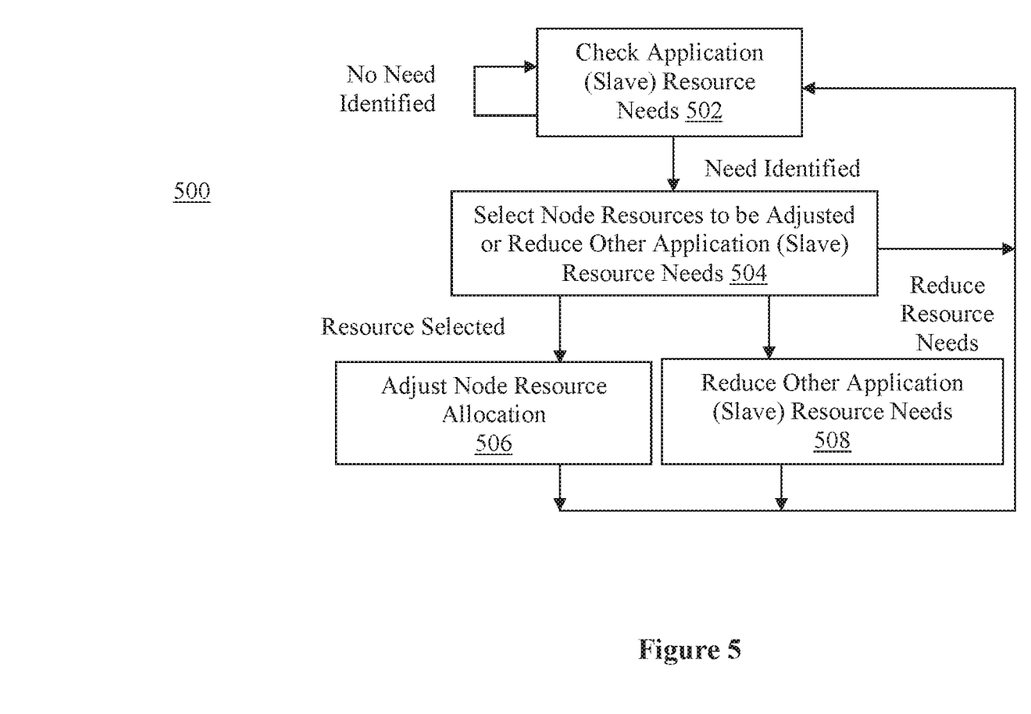

FIGS. 4-5 illustrate an example process for assuring service level agreement of an application via node level service assurance, according to the disclosed embodiments. As illustrated, the process may include process 400 for configuring SAM agents and interacting with application masters as depicted in FIG. 4, and process 500 for assuring service level for application slaves distributed on a plurality of computing nodes of a computing cluster, via node level service assurance.

As shown in FIG. 4, process 400 may include operations at block 402-408. The operations may be performed by e.g., the earlier described SAM master 107 of FIGS. 1-2. In alternate embodiments, process 400 may be practiced with additional operations, or with some of the operations omitted, combined and/or re-ordered.

Process 400 may start at block 402. At block 402, an application level SLA may be obtained/provided. Next, at block 404, computing node usage may be obtained, e.g., from the application master. Then at block 406, the node level SLA may be derived. As earlier described, the node level SLA may be derived through decomposition of the application level SLA in view of the capacity/capability of the computing nodes used.

Next, process 400 may wait at block 406 for reporting from the SAM agents. On receipt of the reports, a determination may be made on whether processes/tasks of application slaves of an application master are being halted. If processes/tasks of application slaves of an application master are not being halted, process 400 may return to block 406, and proceed therefrom as earlier described. On the other hand, processes/tasks of application slaves of an application master are being halted, process 400 may proceed to block 408. At block 408, throttle commands may be sent to the application master to halt further spawning of application slaves by the application master. Therefore, process 400 may proceed back to block 406, and proceed therefrom.

As shown in FIG. 5, process 500 may include operations at block 502-508. The operations may be performed by e.g., the earlier described SAM agent 108 of FIGS. 1-3. In alternate embodiments, process 500 may be practiced with additional operations, or with some of the operations omitted, combined and/or re-ordered.

As shown, process 500 may start at block 502. At block 502, application instances on a computer node may be checked for resource needs. As described earlier, the checking may be performed directly by querying the application instances on their needs, or indirectly by querying the application instances on various performance metrics, and infer the needs from the performance metrics. If no new needs are identified, process 500 may remain at block 502, until new needs are identified.

On identification of needs, process 500 may proceed to block 504. At block 504, resource allocation to be adjusted and/or resource needs to be reduced may be selected. For example, allocation or re-allocation of CPU resources, memory resources and/or I/O resources may be considered in view of the needs identified in block 502. In some situations, allocation of CPU, memory, and I/O resources may be selected from free unallocated resources. In other situations, allocation of CPU, memory, and I/O resources may require de-allocation of some of these resources from other application instances to free and make those resources selected for allocation. However, in situations where allocation and/or de-allocation of hardware resources are not selected (not viable), reduction of resource needs of some of the application instances may be selected.

On a determination to readjust resource allocation, process 500 may proceed to block 506. At block 506, allocation of hardware resources to the application instances on a computer node may be adjusted. On the other hand, on a determination to reduce resource needs of some of the application instances, process 500 may proceed to block 508. At block 508, the application instances may be asked to curtail their resource needs, e.g., by reducing and/or temporarily halting one or more their processes/tasks. At a later point in time, the application instances may be informed that additional processes/tasks may be spawned and/or re-started.

From block 506 or 508, process 500 may return to block 502, and proceed there from as earlier described.

Figure 6:
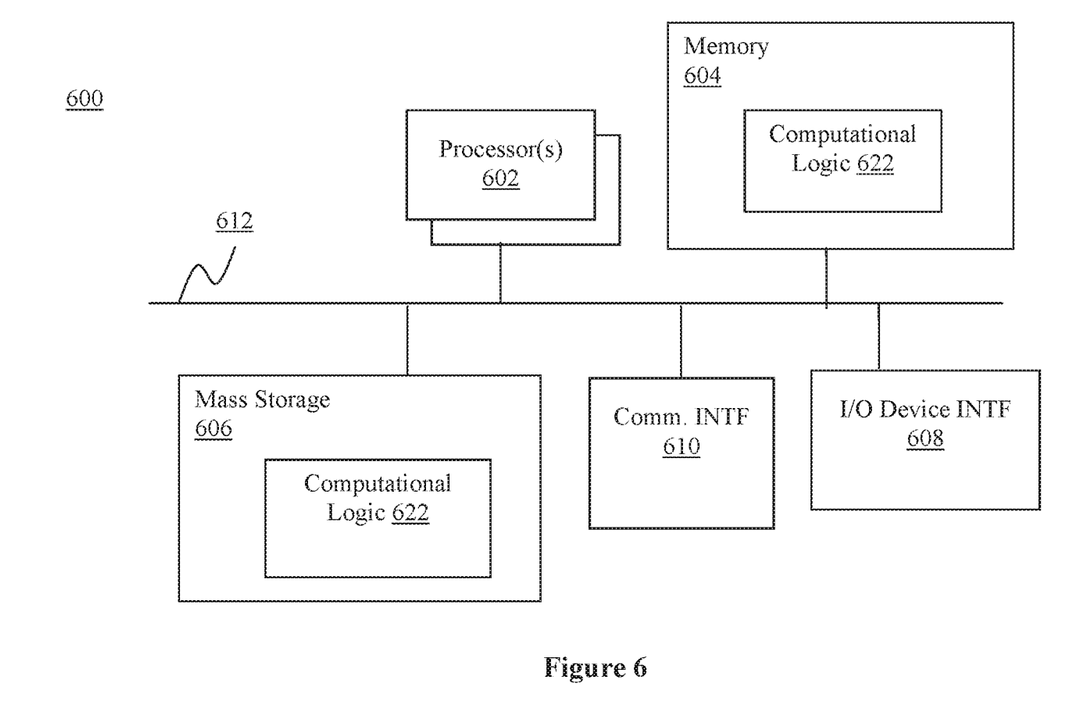
FIG. 6 illustrates an example computer system suitable for use to practice various aspects of the present disclosure, according to various embodiments.

FIG. 6 illustrates an example computer system that may be suitable for use to practice selected aspects of the present disclosure. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control and so forth) and communication interfaces 610 (such as network interface cards, modems and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with SAM 108 of FIG. 1 and/or processes 200, 300 and/or 400 of FIGS. 2, 3, and/or 4, earlier described, collectively referred to as computational logic 622. The various elements may be implemented by assembler instructions supported by processor(s) 602 or high-level languages, such as, for example, C, that can be compiled into such instructions.

The number, capability and/or capacity of these elements 610-612 may vary, depending on whether computer 600 is used as a mobile device, a stationary device or a server. When use as mobile device, the capability and/or capacity of these elements 610-612 may vary, depending on whether the mobile device is a smartphone, a computing tablet, an ultrabook or a laptop. Otherwise, the constitutions of elements 610-612 are known, and accordingly will not be further described.

Figure 7:
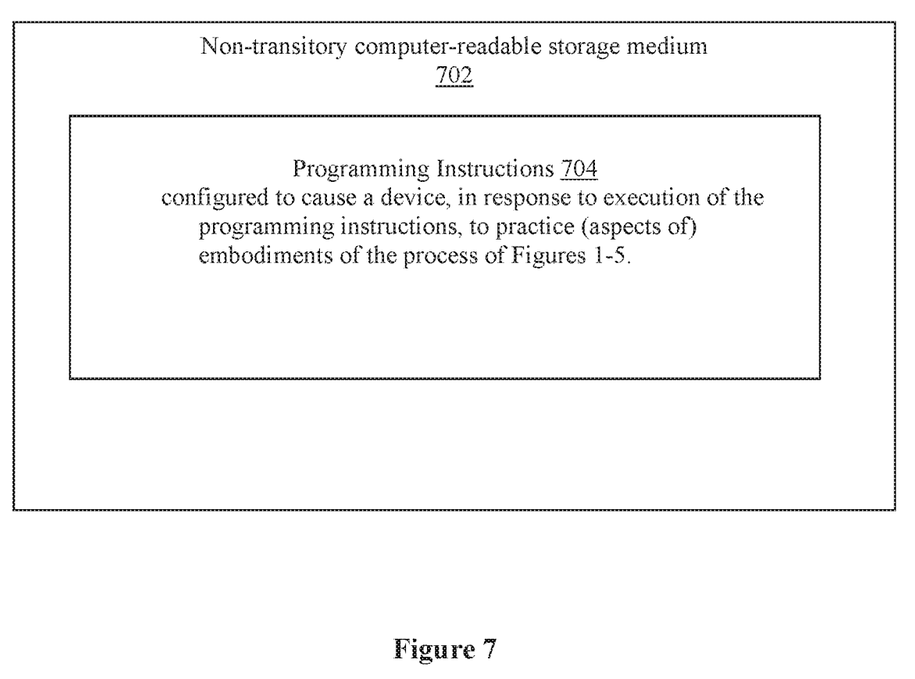
FIG. 7 illustrates a storage medium having instructions for practicing methods described with references to FIGS. 1-5, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., computer 600, in response to execution of the programming instructions, to perform operations associated with SAM master and agent 107 and 108 of FIG. 1 and/or processes 200, 300, 400 and/or 500 of FIGS. 2, 3, 4 and/or 5. In alternate embodiments, programming instructions 704 may be disposed on multiple computer-readable non-transitory storage media 702 instead. In alternate embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of processors 602 may be packaged together with memory having computational logic 622 (in lieu of storing on memory 604 and storage 606). For one embodiment, at least one of processors 602 may be packaged together with memory having computational logic 622 to form a System in Package (SiP). For one embodiment, at least one of processors 602 may be integrated on the same die with memory having computational logic 622. For one embodiment, at least one of processors 602 may be packaged together with memory having computational logic 622 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be a server for cluster computing comprising memory and input/output resources; one or more processors coupled with the memory and the input/output resources, to operate one of a plurality of application slaves of an application master; wherein the other application slaves are operated on other servers, which, together with the server, are members of a computing cluster. The server may further comprise a service assurance manager agent to manage allocation of the one or more processors, the memory and the input/output resources to the application slave, to assure compliance with a node level service level agreement, derived from an application level service level agreement, to contribute in proximate assurance of compliance with the application level service agreement; wherein the application level service agreement specifies the aggregate service level to be provided by the application master and slaves.

Example 2 may be example 1, wherein the service assurance manager agent may receive the node level service level agreement from a service assurance manager master.

Example 3 may be example 1, wherein the service assurance manager agent may query the application slave for processor, memory or input/output resource needs.

Example 4 may be example 1, wherein the service assurance manager agent may query the application slave on one or more performance metrics.

Example 5 may be any one of examples 1-4, wherein the service assurance manager agent may select one or more of the one or more processors, memory or input/output resources for resource allocation or de-allocation adjustments, or reduce resource needs of other application slaves on the server, wherein the other application slaves are associated with other application masters.

Example 6 may be example 5, wherein the service assurance manager agent may provide one or more throttling commands to the application slave or to another application slave on the server, wherein the other application slave is associated with another application master.

Example 7 may be example 6, wherein throttling commands may comprise a command to preempt a process of the other application slave, a command to decrease a number of processes of the other application slave, or a command to pause the other application slave.

Example 8 may be example 7, wherein the throttling commands may further comprise a command to increase a number of processes of the other application slave, or a command to resume the other application slave.

Example 9 may be example 6, wherein the service assurance manager agent may provide one or more throttling commands to the other application master, through a service assurance manager master of the service assurance manager agent.

Example 10 may be example 5, wherein the service assurance manager agent may query the one or more processors, the memory or the L/O resources for status or resource availability.

Example 11 may be example 5, wherein the service assurance manager agent may provide one or more allocation commands to the one or more processors, the memory or the I/O resources to allocate additional resources of the one or more processors, the memory or the I/O resources to the application slave.

Example 12 may be example 5, wherein the service assurance manager agent may provide one or more de-allocation commands to the one or more processors, the memory or the I/O resources to de-allocate resources of the one or more processors, the memory or the I/O resources previously allocated to another application slave on the server, wherein the other application slave is associated with another application master.

Example 13 may be a method for managing cluster computing, comprising: operating, by a computing node of a computing cluster, at least one of a plurality of application slaves of an application master, in conjunction with other computing nodes of the computing cluster operating the other application slaves; and managing, by the computing node, with an service assurance manager agent, allocation of one or more processors, memory and input/output resources of the computing node to the application slave, to assure compliance with a node level service level agreement, derived from an application level service level agreement, to contribute to proximate assurance of compliance with the application level service agreement; wherein the application level service agreement specifies the aggregate service level to be jointly provided by the application master and slaves.

Example 14 may be example 13, wherein managing may comprise receiving, with the service assurance manager agent, the node level service level agreement from a service assurance manager master.

Example 15 may be example 13, wherein managing may further comprise the service assurance manager agent querying the application slave for processor, memory or input/output resource needs.

Example 16 may be example 13, wherein managing may further comprise the service assurance manager agent querying the application slave on one or more performance metrics.

Example 17 may be any one of examples 13-16, wherein managing may further comprise the service assurance manager agent selecting one or more of the one or more processors, memory or input/output resources for resource allocation or de-allocation adjustments, or reducing resource needs of other application slaves on the server, wherein the other application slaves are associated with other application masters.

Example 18 may be example 17, wherein managing may further comprise the service assurance manager agent providing one or more throttling commands to the application slave or to another application slave on the server, wherein the other application slave is associated with another application master.

Example 19 may be example 18, wherein throttling commands may comprise a command to preempt a process of the other application slave, a command to decrease a number of processes of the other application slave, or a command to pause the other application slave.

Example 20 may be example 19, wherein the throttling commands may further comprise a command to increase a number of processes of the other application slave, or a command to resume the other application slave.

Example 21 may be example 18, wherein managing may further comprise the service assurance manager agent providing one or more throttling commands to the other application master, through a service assurance manager master of the service assurance manager agent.

Example 22 may be example 18, wherein managing may further comprise the service assurance manager agent querying the one or more processors, the memory or the I/O resources for status or resource availability.

Example 23 may be example 17, wherein managing may further comprise the service assurance manager agent providing one or more allocation commands to the one or more processors, the memory or the I/O resources to allocate additional resources of the one or more processors, the memory or the I/O resources to the application slave.

Example 24 may be example 17, wherein managing may further comprise the service assurance manager agent providing one or more de-allocation commands to the one or more processors, the memory or the I/O resources to de-allocate resources of the one or more processors, the memory or the I/O resources previously allocated to another application slave on the server, wherein the other application slave is associated with another application master.

Example 25 may be one or more computer-readable media comprising instructions to cause a computing node of a computing cluster, in response to execution of the instructions by the computing node, to operate a service assurance manager agent to: manage allocation of one or more processors, memory and input/output resources of the computing node to one of a plurality of application slaves of an application master, operated on the computing node, to assure compliance with a node level service level agreement, derived from an application level service level agreement of the application master, to contribute to proximate assurance of compliance with the application level service agreement; wherein the application level service agreement specifies the aggregate service level to be jointly provided by the application master and slaves, wherein the other application slaves are operated on other computing nodes of the computing cluster.

Example 26 may be example 25, wherein the service assurance manager agent may receive the node level service level agreement from a service assurance manager master.

Example 27 may be example 25, wherein the service assurance manager agent may query the application slave for processor, memory or input/output resource needs.

Example 28 may be example 25, wherein the service assurance manager agent may query the application slave on one or more performance metrics.

Example 29 may be any one of examples 25-28, wherein the service assurance manager agent may select one or more of the one or more processors, memory or input/output resources for resource allocation or de-allocation adjustments, or reduce resource needs of other application slaves on the server, wherein the other application slaves are associated with other application masters.

Example 30 may be example 29, wherein the service assurance manager agent may provide one or more throttling commands to the application slave or to another application slave on the server, wherein the other application slave is associated with another application master.

Example 31 may be example 30, wherein throttling commands comprise a command to preempt a process of the other application slave, a command to decrease a number of processes of the other application slave, or a command to pause the other application slave.

Example 32 may be example 31, wherein the throttling commands further comprise a command to increase a number of processes of the other application slave, or a command to resume the other application slave.

Example 33 may be example 30, wherein the service assurance manager agent may provide one or more throttling commands to the other application master, through a service assurance manager master of the service assurance manager agent.

Example 34 may be example 29, wherein the service assurance manager agent may query the one or more processors, the memory or the I/O resources for status or resource availability.

Example 35 may be example 29, wherein the service assurance manager agent may provide one or more allocation commands to the one or more processors, the memory or the I/O resources to allocate additional resources of the one or more processors, the memory or the I/O resources to the application slave.

Example 36 may be example 29, wherein the service assurance manager agent may provide one or more de-allocation commands to the one or more processors, the memory or the I/O resources to de-allocate resources of the one or more processors, the memory or the I/O resources previously allocated to another application slave on the server, wherein the other application slave is associated with another application master.

Example 37 may be a server for cluster computing, comprising: means for operating, by a computing node of a computing cluster, at least one of a plurality of application slaves of an application master, in conjunction with other computing nodes of the computing cluster operating the other application slaves; and means for managing, by the computing node, allocation of one or more processors, memory and input/output resources of the computing node to the application slave, to assure compliance with a node level service level agreement, derived from an application level service level agreement, to contribute to proximate assurance of compliance with the application level service agreement; wherein the application level service agreement specifies the aggregate service level to be jointly provided by the application master and slaves.

Example 38 may be example 37, wherein means for managing may comprise means for receiving the node level service level agreement from a service assurance manager master.

Example 39 may be example 37, wherein means for managing may further comprise means for querying the application slave for processor, memory or input/output resource needs.

Example 40 may be example 37, wherein means for managing may further comprise means for querying the application slave on one or more performance metrics.

Example 41 may be example 37-40, wherein means for managing may further comprise means for selecting one or more of the one or more processors, memory or input/output resources for resource allocation or de-allocation adjustments, or reducing resource needs of other application slaves on the server, wherein the other application slaves are associated with other application masters.

Example 42 may be example 41, wherein means for managing may further comprise means for providing one or more throttling commands to the application slave or to another application slave on the server, wherein the other application slave is associated with another application master.

Example 43 may be example 42, wherein throttling commands comprise a command to preempt a process of the other application slave, a command to decrease a number of processes of the other application slave, or a command to pause the other application slave.

Example 44 may be example 43, wherein the throttling commands further comprise a command to increase a number of processes of the other application slave, or a command to resume the other application slave.

Example 45 may be example 42, wherein means for managing may further comprise means for providing one or more throttling commands to the other application master, through a service assurance manager master of the service assurance manager agent.

Example 46 may be example 42, wherein means for managing may further comprise means for querying the one or more processors, the memory or the I/O resources for status or resource availability.

Example 47 may be example 41, wherein means for managing may further comprise means for providing one or more allocation commands to the one or more processors, the memory or the I/O resources to allocate additional resources of the one or more processors, the memory or the I/O resources to the application slave.

Example 48 may be example 41, wherein means for managing may further comprise means for providing one or more de-allocation commands to the one or more processors, the memory or the I/O resources to de-allocate resources of the one or more processors, the memory or the I/O resources previously allocated to another application slave on the server, wherein the other application slave is associated with another application master.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A server for cluster computing, comprising:
   memory and input/output resources;
   one or more processors coupled with the memory and the input/output resources, to operate one of a plurality of application children of an application parent; wherein other application children are operated on other servers, which, together with the server, are members of a computing cluster; and
   a service assurance manager agent to manage allocation of the one or more processors, the memory and the input/output resources to the application child, to assure compliance with a node level service level agreement, that is a portion of an application level service level agreement, to contribute in proximate assurance of compliance with the application level service level agreement; wherein the application level service level agreement specifies an aggregate service level to be provided by the application parent and children;
   wherein the service assurance manager agent is to select one or more of the one or more processors, memory or input/output resources for resource allocation or de-allocation adjustments, or reduce resource needs of other application children on the server, wherein the other application children are associated with other application parent.

2. The server of claim 1, wherein the service assurance manager agent is to receive the node level service level agreement from a service assurance manager broker.

3. The server of claim 1, wherein the service assurance manager agent is to query the application child for processor, memory or input/output resource needs.

4. The server of claim 1, wherein the service assurance manager agent is to query the application child on one or more performance metrics.

5. The server of claim 1, wherein the service assurance manager agent is to provide one or more throttling commands to the application child or to another application child on the server, wherein the other application child is associated with another application parent.

6. The server of claim 5, wherein the service assurance manager agent is to provide one or more throttling commands to the other application parent, through a service assurance manager broker of the service assurance manager agent.

7. The server of claim 5, wherein throttling commands comprise a command to preempt a process of the other application child, a command to decrease a number of processes of the other application child, or a command to pause the other application child.

8. The server of claim 7, wherein the throttling commands further comprise a command to increase a number of processes of the other application child, or a command to resume the other application child.

9. The server of claim 1, wherein the service assurance manager agent is to query the one or more processors, the memory or the I/O resources for status or resource availability.

10. The server of claim 1, wherein the service assurance manager agent is to provide one or more allocation commands to the one or more processors, the memory or the I/O resources to allocate additional resources of the one or more processors, the memory or the I/O resources to the application child, or to provide one or more de-allocation commands to the one or more processors, the memory or the I/O resources to de-allocate resources of the one or more processors, the memory or the I/O resources previously allocated to another application child on the server, wherein the other application child is associated with another application parent.

11. A method for managing cluster computing, comprising:
   operating, by a computing node of a computing cluster, at least one of a plurality of application children of an application parent, in conjunction with other computing nodes of the computing cluster operating other application children; and
   managing, by the computing node, with a service assurance manager agent, allocation of one or more processors, memory and input/output resources of the computing node to the application child, to assure compliance with a node level service level agreement, that is a portion of an application level service level agreement, to contribute to proximate assurance of compliance with the application level service agreement; wherein the application level service level agreement specifies an aggregate service level to be jointly provided by the application parent and children;
   wherein managing further comprises the service assurance manager agent selecting one or more of the one or more processors, memory or input/output resources for resource allocation or de-allocation adjustments, or reducing resource needs of other application children on a server, wherein the other application children are associated with other application parent.

12. One or more non-transitory computer-readable media comprising instructions to cause a computing node of a computing cluster, in response to execution of the instructions by the computing node, to operate a service assurance manager agent to:
   manage allocation of one or more processors, memory and input/output resources of the computing node to one of a plurality of application children of an application parent, operated on the computing node, to assure compliance with a node level service level agreement, that is a portion of an application level service level agreement of the application parent, to contribute to proximate assurance of compliance with the application level service level agreement; wherein the application level service level agreement specifies an aggregate service level to be jointly provided by the application parent and children, wherein the other application children are operated on other computing nodes of the computing cluster;
   wherein the service assurance manager agent is to select one or more of the one or more processors, memory or input/output resources for resource allocation or de-allocation adjustments, or reduce resource needs of other application children on the server, wherein the other application children are associated with other application parent.

13. The one or more non-transitory computer-readable media of claim 12, wherein the service assurance manager agent is to receive the node level service level agreement from a service assurance manager broker.

14. The one or more non-transitory computer-readable media of claim 12, wherein the service assurance manager agent is to query the application child for processor, memory or input/output resource needs.

15. The one or more non-transitory computer-readable media of claim 12, wherein the service assurance manager agent is to provide one or more throttling commands to the application child or to another application child on the server, wherein the other application child is associated with another application parent.

16. The one or more non-transitory computer-readable media of claim 15, wherein the service assurance manager agent is to provide one or more de-allocation commands to the one or more processors, the memory or the I/O resources to de-allocate resources of the one or more processors, the memory or the I/O resources previously allocated to another application child on the server, wherein the other application child is associated with another application parent.

17. The one or more non-transitory computer-readable media of claim 15, wherein throttling commands comprise a command to preempt a process of the other application child, a command to decrease a number of processes of the other application child, or a command to pause the other application child.

18. The one or more non-transitory computer-readable media of claim 17, wherein the throttling commands further comprise a command to increase a number of processes of the other application child, or a command to resume the other application child.

19. The one or more non-transitory computer-readable media of claim 15, wherein the service assurance manager agent is to provide one or more throttling commands to the other application parent, through a service assurance manager broker of the service assurance manager agent.

20. The one or more non-transitory computer-readable media of claim 12, wherein the service assurance manager agent is to query the one or more processors, the memory or the I/O resources for status or resource availability.

21. The one or more non-transitory computer-readable media of claim 12, wherein the service assurance manager agent is to provide one or more allocation commands to the one or more processors, the memory or the I/O resources to allocate additional resources of the one or more processors, the memory or the I/O resources to the application child.

* * * * *